(12) United States Patent
Matsuno

(10) Patent No.: US 8,457,858 B2
(45) Date of Patent: Jun. 4, 2013

(54) VEHICLE MOTION CONTROL APPARATUS

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 698 days.

(21) Appl. No.: 12/654,485

(22) Filed: Dec. 22, 2009

(65) Prior Publication Data

US 2010/0168977 A1    Jul. 1, 2010

(30) Foreign Application Priority Data

Dec. 25, 2008   (JP) .................................. 2008-330905

(51) Int. Cl.
*B60T 7/12*   (2006.01)
*G05D 1/00*   (2006.01)
*G06F 7/00*   (2006.01)
*G06F 17/00*  (2006.01)

(52) U.S. Cl.
USPC .................................... 701/74; 701/1; 701/82

(58) Field of Classification Search
USPC ................. 701/1–80; 303/140–149
See application file for complete search history.

(56) References Cited

U.S. PATENT DOCUMENTS

| | | | | |
|---|---|---|---|---|
| 5,747,682 A * | 5/1998 | Hirano ........................ | 73/115.07 |
| 5,829,847 A * | 11/1998 | Tozu et al. .................... | 303/167 |
| 5,857,754 A * | 1/1999 | Fukami et al. ................ | 303/146 |
| 6,188,316 B1 | 2/2001 | Matsuno et al. | |
| 6,659,570 B2 * | 12/2003 | Nakamura .................... | 303/146 |
| 6,697,728 B2 * | 2/2004 | Kin et al. ....................... | 701/70 |
| 6,708,088 B2 * | 3/2004 | Matsuno et al. ................. | 701/1 |
| 6,862,512 B2 * | 3/2005 | Arndt et al. ..................... | 701/70 |
| 6,885,931 B2 * | 4/2005 | Anwar ............................. | 701/72 |
| 6,925,371 B2 * | 8/2005 | Yasui et al. ..................... | 701/72 |
| 7,315,777 B2 * | 1/2008 | Ono ................................ | 701/70 |
| 7,567,865 B2 * | 7/2009 | Koibuchi et al. ............... | 701/70 |
| 7,702,442 B2 * | 4/2010 | Takenaka ........................ | 701/48 |
| 7,890,230 B2 * | 2/2011 | Tsukasaki et al. .............. | 701/37 |
| 7,974,761 B2 * | 7/2011 | Maeda et al. ................... | 701/70 |
| 8,027,775 B2 * | 9/2011 | Takenaka et al. ............... | 701/70 |
| 8,055,420 B2 * | 11/2011 | Matsuno et al. ................ | 701/69 |
| 8,108,106 B2 * | 1/2012 | Takahara et al. ............... | 701/41 |
| 8,135,524 B2 * | 3/2012 | Yoneda et al. .................. | 701/69 |

FOREIGN PATENT DOCUMENTS

| | | | |
|---|---|---|---|
| EP | 1958839 | * | 7/2007 |
| JP | 11-255004 | | 9/1999 |
| JP | 2001-233195 | | 8/2001 |
| JP | 2005-193794 | | 7/2005 |

* cited by examiner

*Primary Examiner* — Khoi Tran
*Assistant Examiner* — Rachid Bendidi
(74) *Attorney, Agent, or Firm* — McGinn IP Law Group, PLLC

(57) ABSTRACT

A front/rear driving/braking force control unit 30 calculates driving/braking forces of front and rear axles that minimize energy loss realizing a target steering characteristic as first front/rear driving/braking forces Fxfte, Fxrte and calculates driving/braking forces of the front and rear axles that realize the target steering characteristic and maximize the sum of maximum tire lateral forces of the front and rear axles as second front/rear driving/braking forces Fxftp, Fxrtp. Then, the front/rear driving/braking force control unit 30 sets a grip margin Mg based on the tire lateral force Fyf, Fyr of the front and rear shafts which is calculated based on lateral acceleration ($d^2y/dt^2$), and road information (road $\mu$), calculates target driving/braking forces Fxft, Fxrt of the front and rear axles according to the grip margin Mg based on the first front/rear driving/braking forces Fxfte, Fxrte and the second front/rear driving/braking forces Fxftp, Fxrtp, and outputs the target driving/braking forces Fxft, Fxrt to a driving/braking force control unit 20.

16 Claims, 12 Drawing Sheets

MAXIMUM TIRE LATERAL FORCE CONSIDERING ONLY NONLINEARITY WITH RESPECT TO FRONT-REAR LOAD SHIFT

VEHICLE MOTION CONTROL APPARATUS

CROSS-REFERENCES TO RELATED APPLICATIONS

The disclosure of Japanese Patent Application No. 2008-330905 filed on Dec. 25, 2008 including the specification, drawings and abstract is incorporated herein by reference in its entirety.

BACKGROUND OF THE INVENTION

1. Field of the Invention

The present invention relates to a vehicle motion control apparatus that improves a vehicle motion performance by controlling driving/braking forces and optimizes a control efficiency or a travel resistance improvement.

2. Description of Related Art

In these days, a vehicle has various vehicle motion control apparatuses. For example, Japanese Patent Application Laid-Open No. 2001-233195 discloses a vehicular attitude control apparatus that generates a vehicle yaw moment toward the inside of a turn by increasing braking force applied to both of front and rear wheels which are in the inner side of the turn when the vehicle is in an understeer condition and generates a vehicle yaw moment toward the outside of a turn by increasing braking force applied to both of front and rear wheels which are in the outer side of the turn when the vehicle is in an oversteer condition.

Further, JP-A No. 2005-193794 discloses a technology of a vehicular deceleration control apparatus that is an apparatus for controlling deceleration by actuating a controller for controlling the vehicle to generate braking force and by operating the transmission to switch to a relatively low-speed shift. The deceleration control apparatus obtains a necessary deceleration based on a curvature of a forward curved road, a distance to the curved road and a vehicle speed and determines a control amount of the controller and a switch amount of the transmission speed shift based on the necessary deceleration.

SUMMARY OF THE INVENTION

However, according to a brake control for improving steering characteristics of a vehicle disclosed in JP-A No. 2001-233195 or a vehicle motion control for applying a necessary brake control according to a traveling path of the vehicle disclosed in JP-A No. 2005-193794, unnecessary energy loss (an increase in traveling resistance) may occur or the vehicle motion performance may not be maximized if the traveling resistance is not considered during the control.

The present invention has been made in the above point of view and has an object to provide a vehicle motion control apparatus capable of properly balancing a smooth and highly fuel-efficient traveling with a low traveling energy loss and a maximized vehicle motion performance according to travel conditions.

The present invention provides a vehicle motion control apparatus including: a maximum tire lateral force calculator configured to calculate maximum tire lateral forces of front and rear axles considering a nonlinearity with respect to front-rear load shift and influence of a friction circle according to driving/braking forces of the front and rear axles and road surface information; a first front/rear driving/braking force calculator configured to calculate the driving/braking forces of the front and rear axles that minimize an energy loss realizing a target steering characteristic as first front/rear driving/braking forces based on the driving/braking forces of the front and rear axles and the maximum tire lateral forces of the front and rear axles; a second front/rear driving/braking force calculator configured to calculate driving/braking forces of the front and rear axles that realize the target steering characteristic and maximize the sum of the maximum tire lateral forces of the front and rear axles as second front/rear driving/braking forces based on the driving/braking forces of the front and rear axles and the maximum tire lateral forces of the front and rear axles; a grip margin calculator configured to calculate a margin of grip of the front and rear wheels as a grip margin based on a travel condition of the vehicle; and a target driving/braking force calculator configured to calculate target driving/braking forces of the front and rear axles based on the first front/rear driving/braking forces and the second front/rear driving/braking forces, according to the grip margin.

The vehicle motion control apparatus of the present invention is capable of properly balancing a smooth and highly fuel-efficient traveling with a low traveling energy loss and a maximized vehicle motion performance according to travel conditions.

DETAILED DESCRIPTION OF THE PREFERRED EMBODIMENTS

Hereinafter, an embodiment of the present invention will be described with reference to the drawings.

Figure 1:
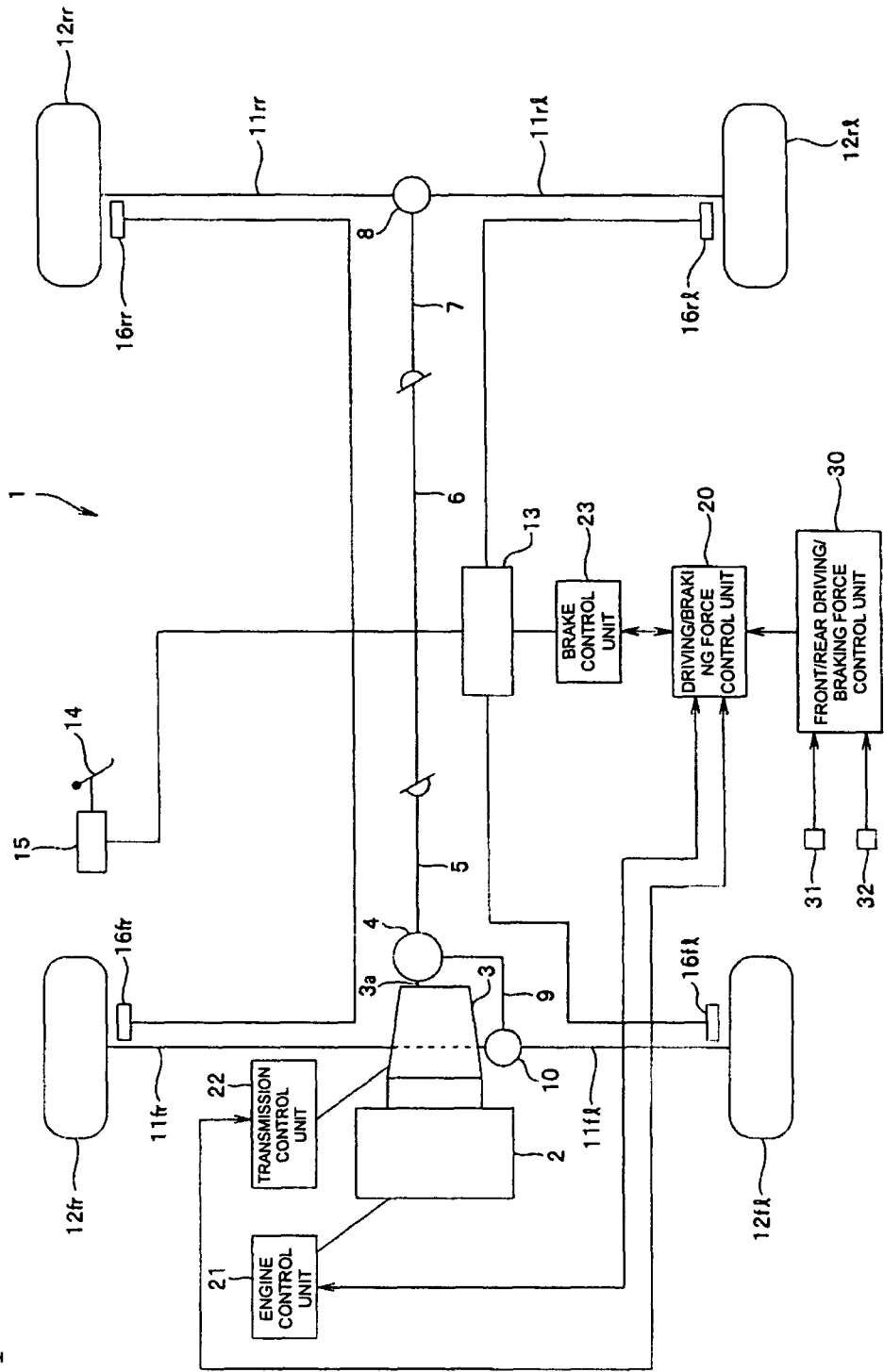
FIG. 1 is an explanatory diagram showing an outline configuration of a vehicle having a vehicle motion control apparatus.
Figure 2:
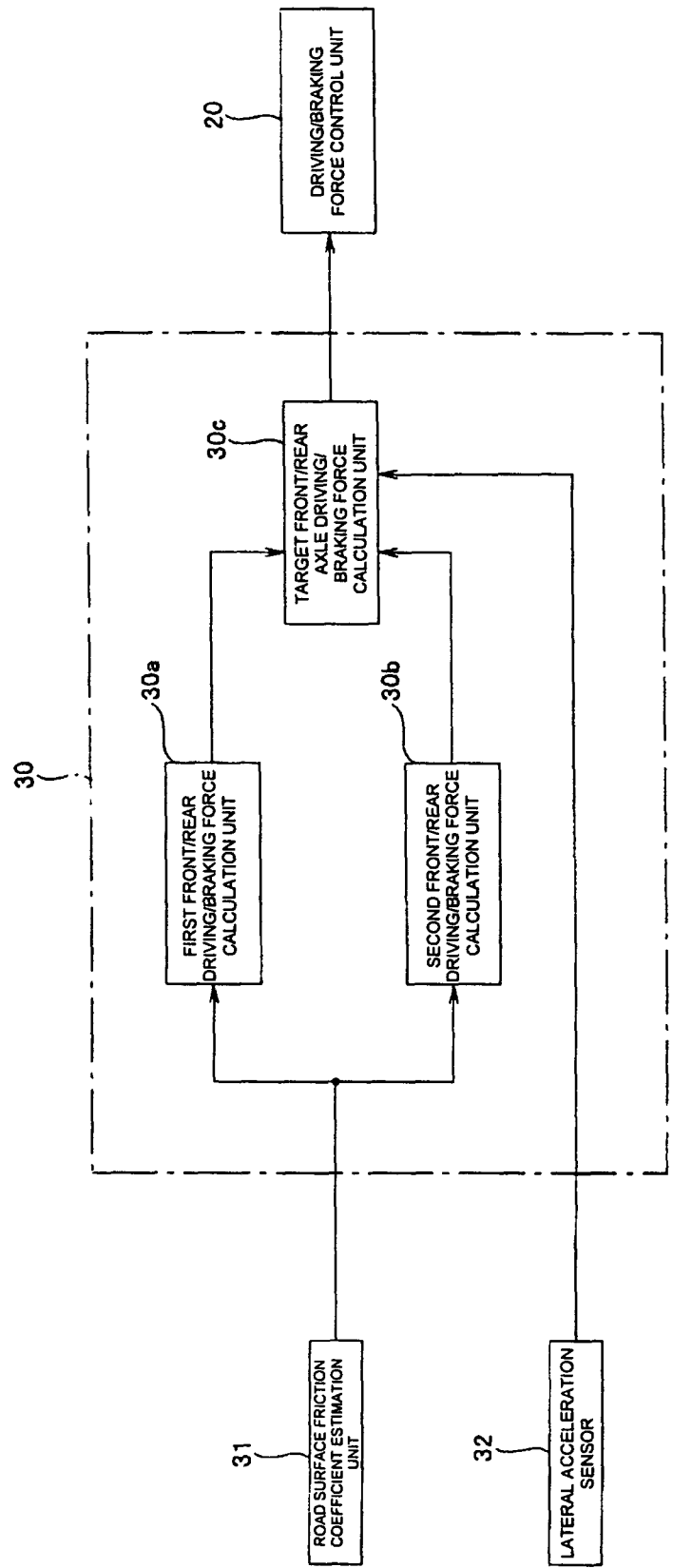
FIG. 2 is a functional block diagram of a front/rear driving/braking force control unit.
Figure 3:
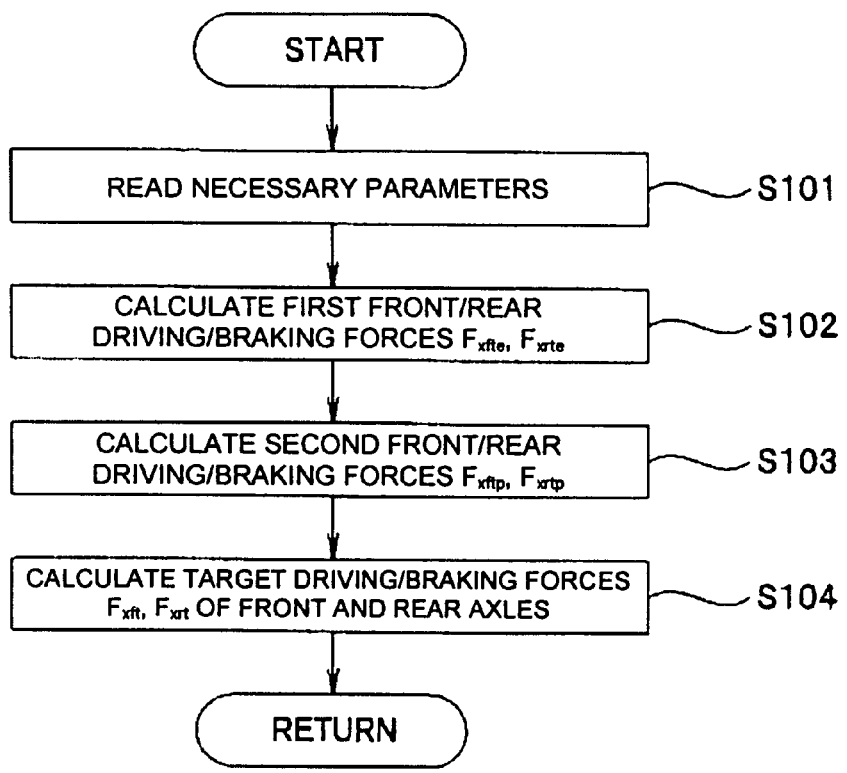
FIG. 3 is a flowchart of a front/rear driving/braking force control program.
Figure 4:
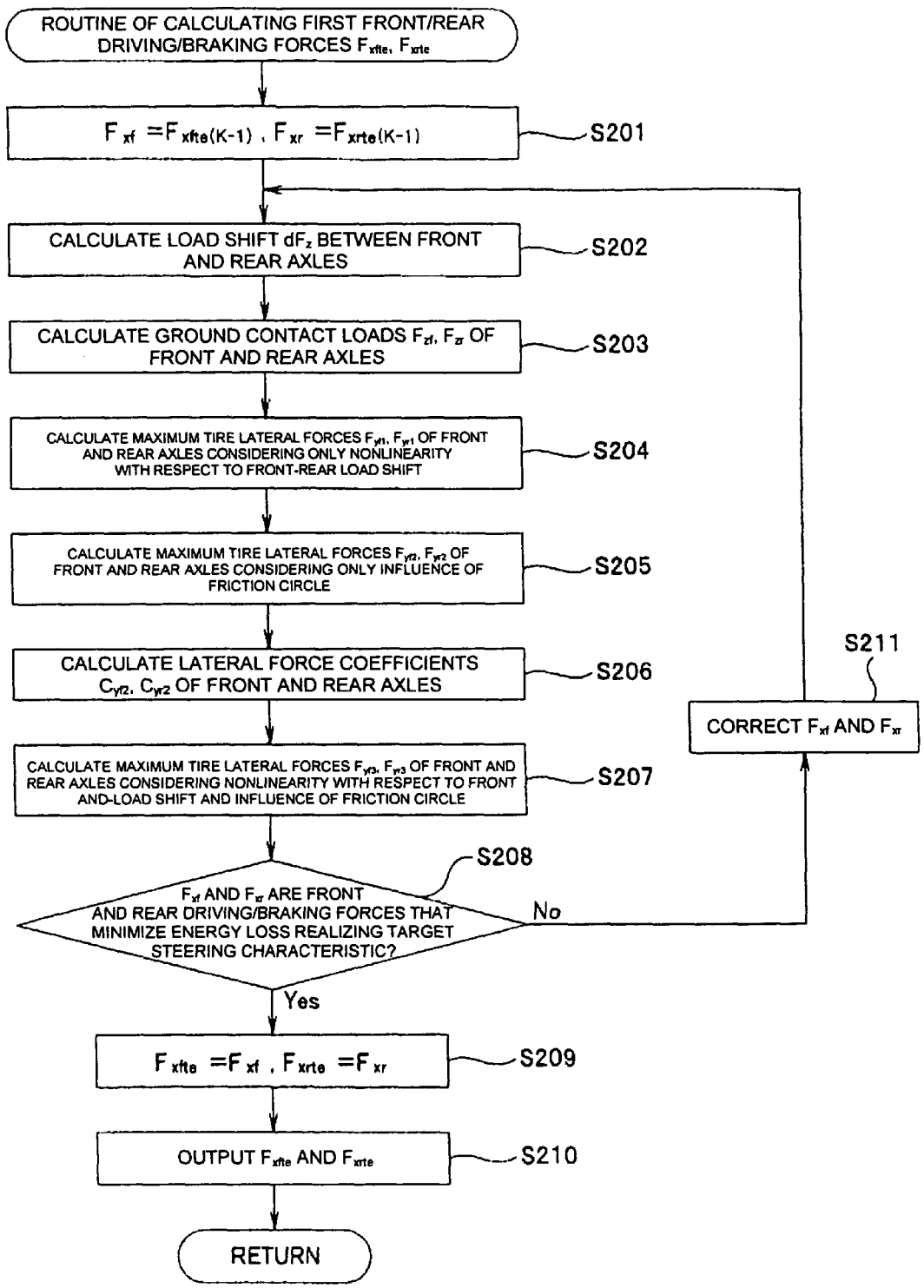
FIG. 4 is a flowchart of a routine for calculating first front/rear driving/braking forces Fxfte, Fxrte.
Figure 5:
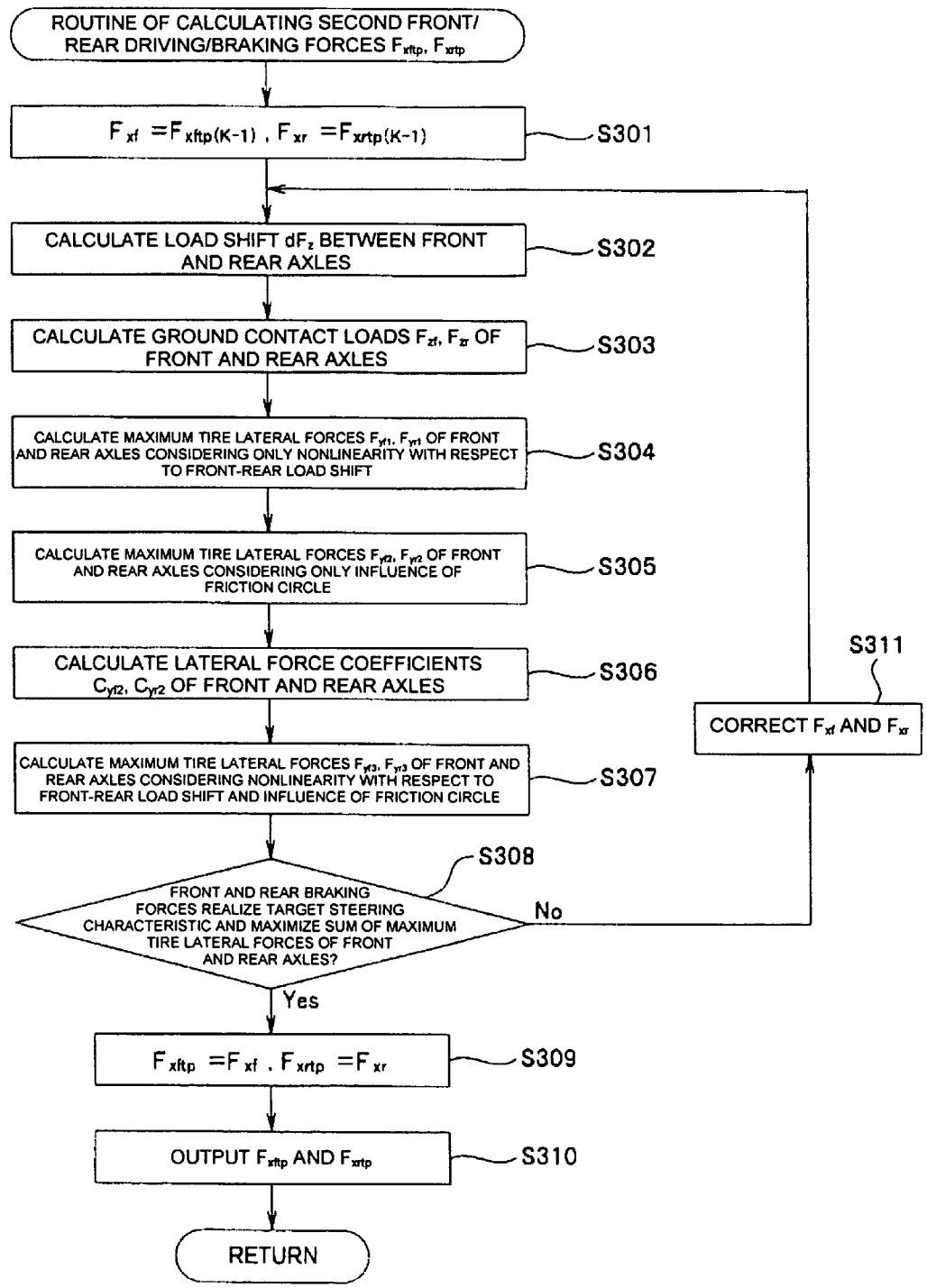
FIG. 5 is a flowchart of a routine for calculating second front/rear driving/braking forces Fxftp, Fxrtp.
Figure 6:
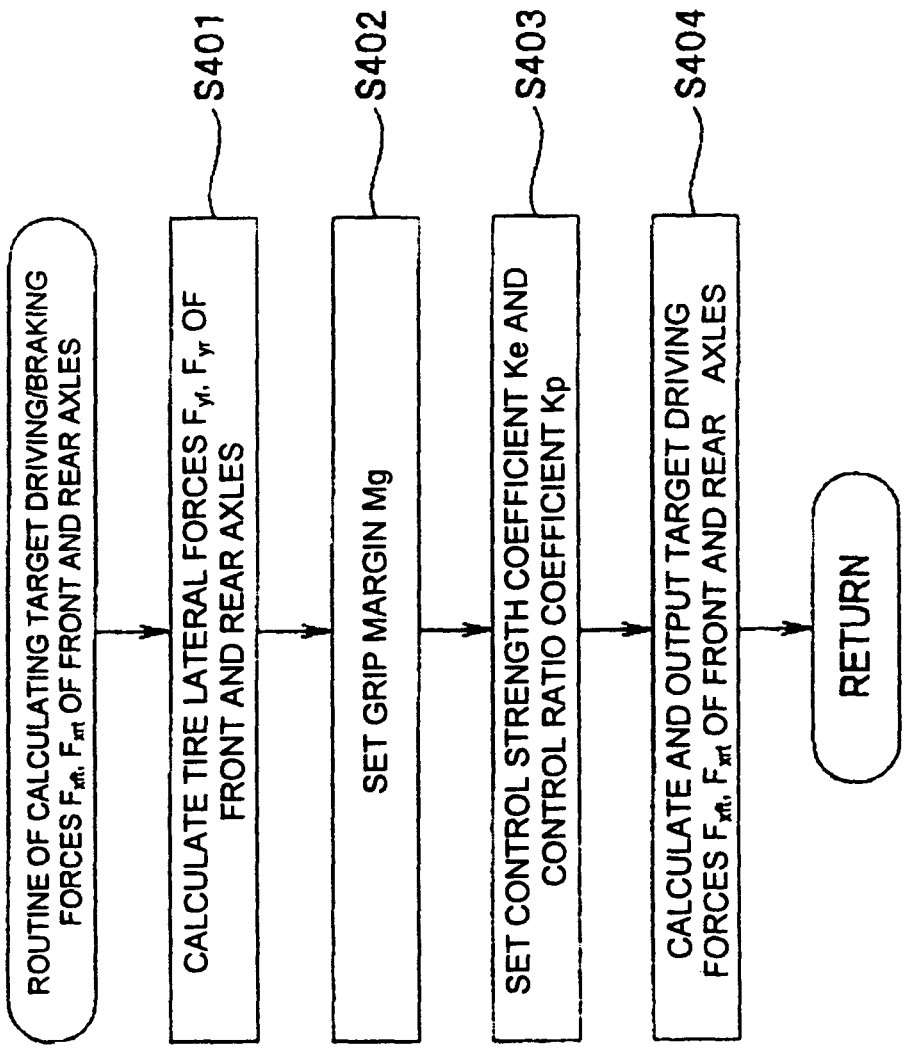
FIG. 6 is a flowchart of a routine for calculating target driving/braking forces Fxft, Fxrt of the front and rear axles.
Figure 7:
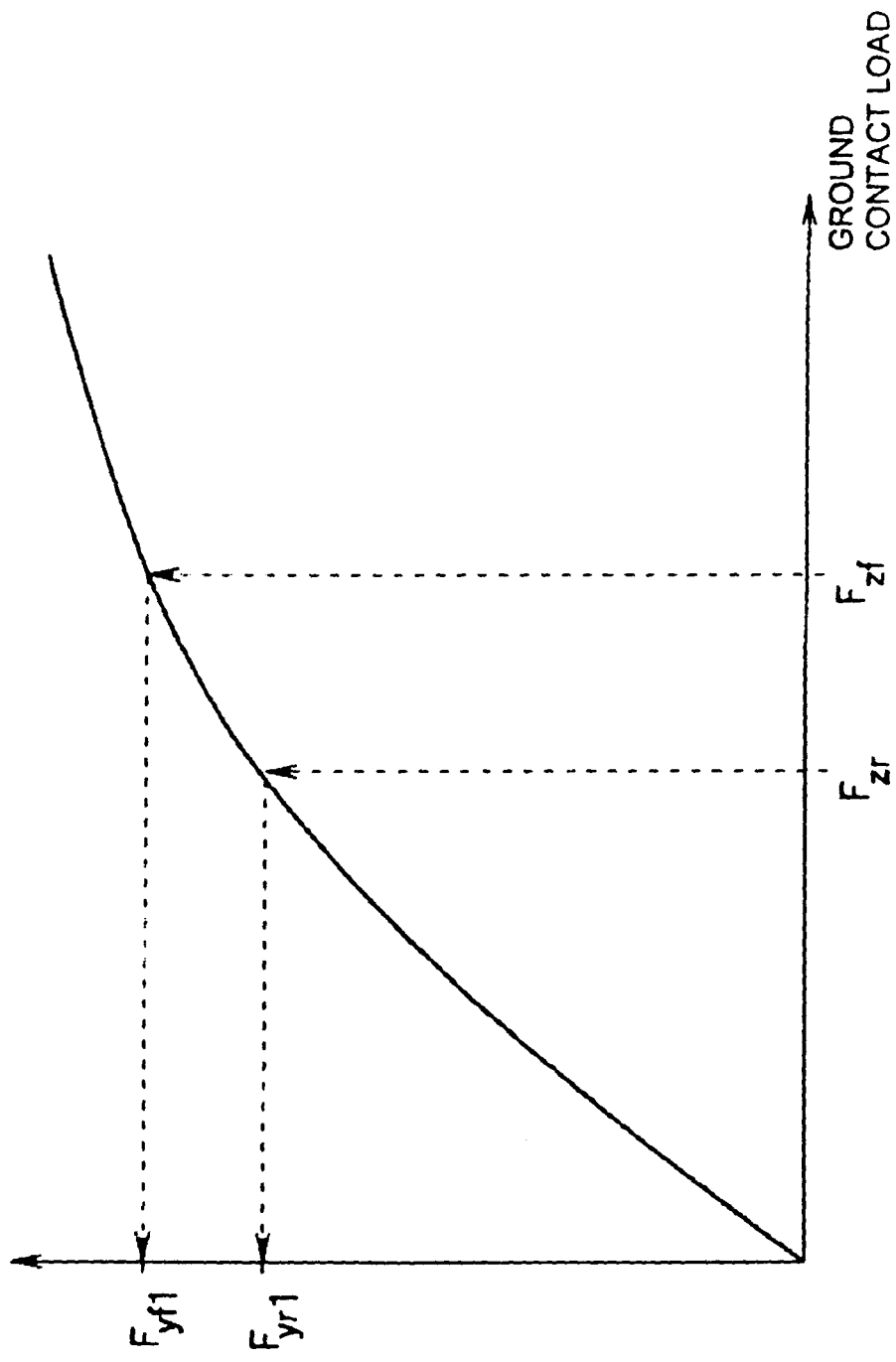
FIG. 7 is a diagram showing a characteristic of a ground contact load and a maximum tire lateral force considering only a nonlinearity with respect to front-rear load shift.
Figure 8:
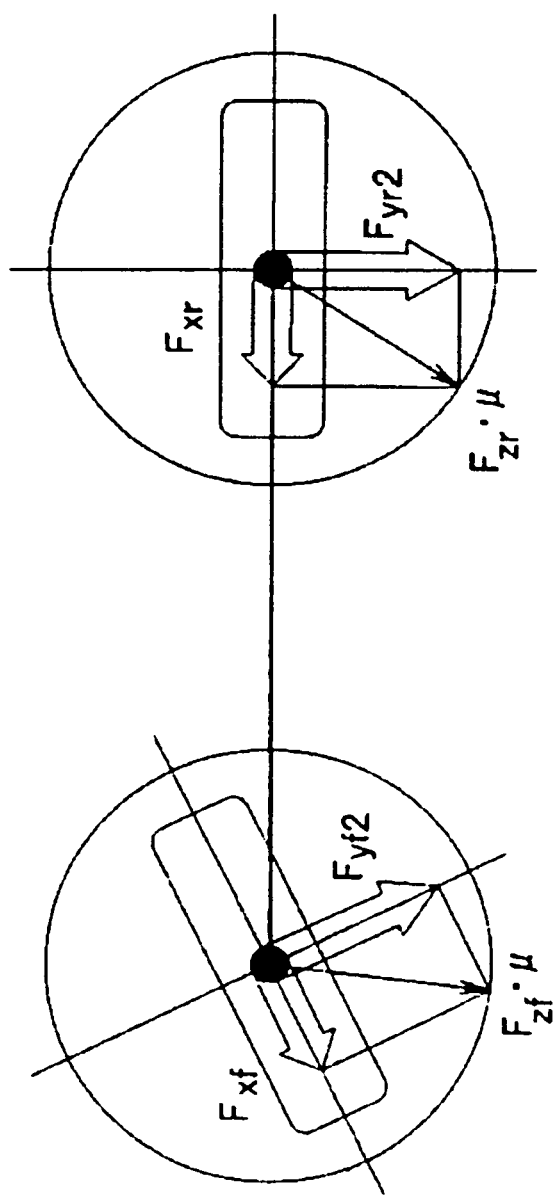
FIG. 8 is an explanatory diagram of the maximum tire lateral force of the front and rear axles considering only the influence of a friction circle.
Figure 9:
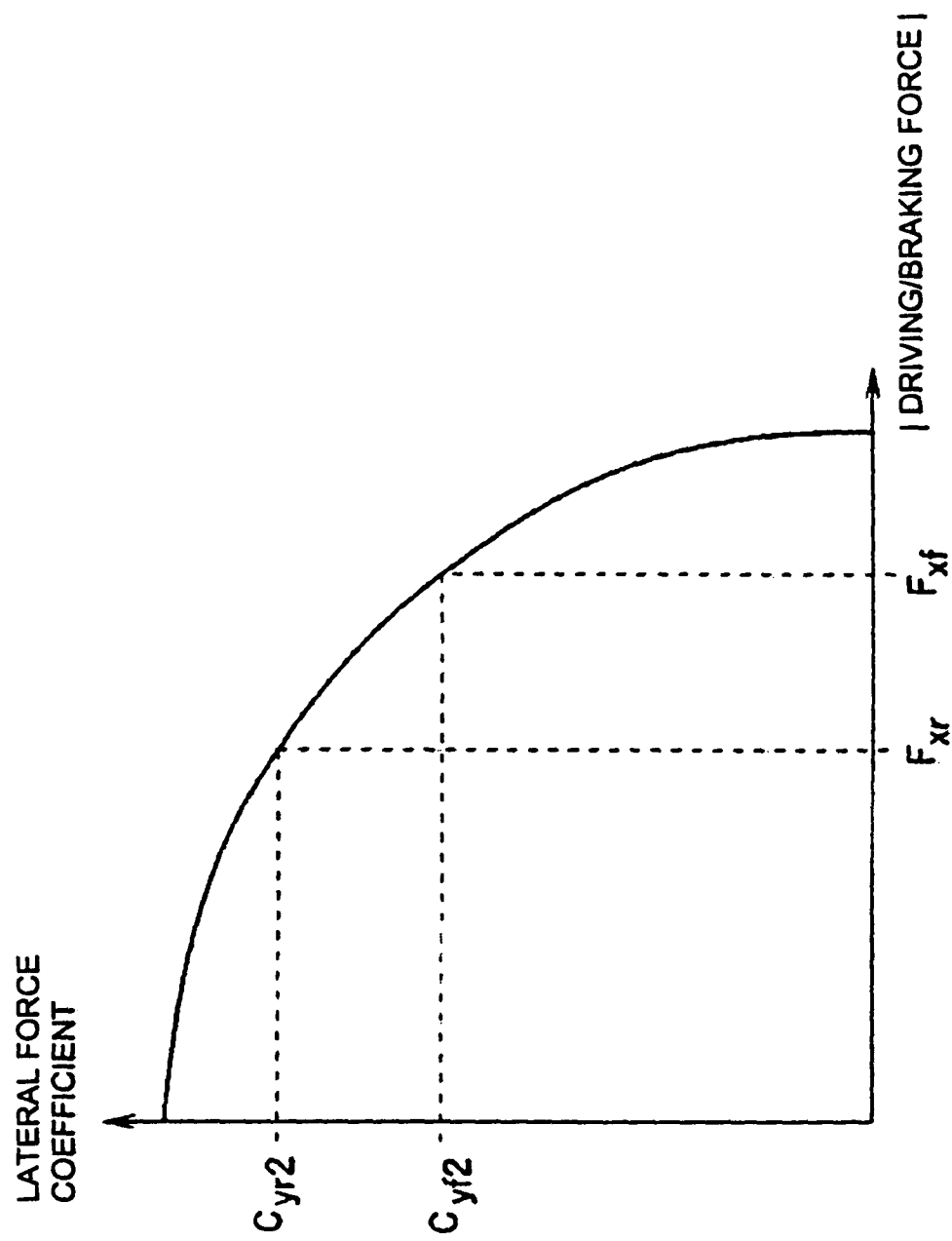
FIG. 9 is an explanatory diagram of a lateral force coefficient of the front and rear axles.
Figure 10:
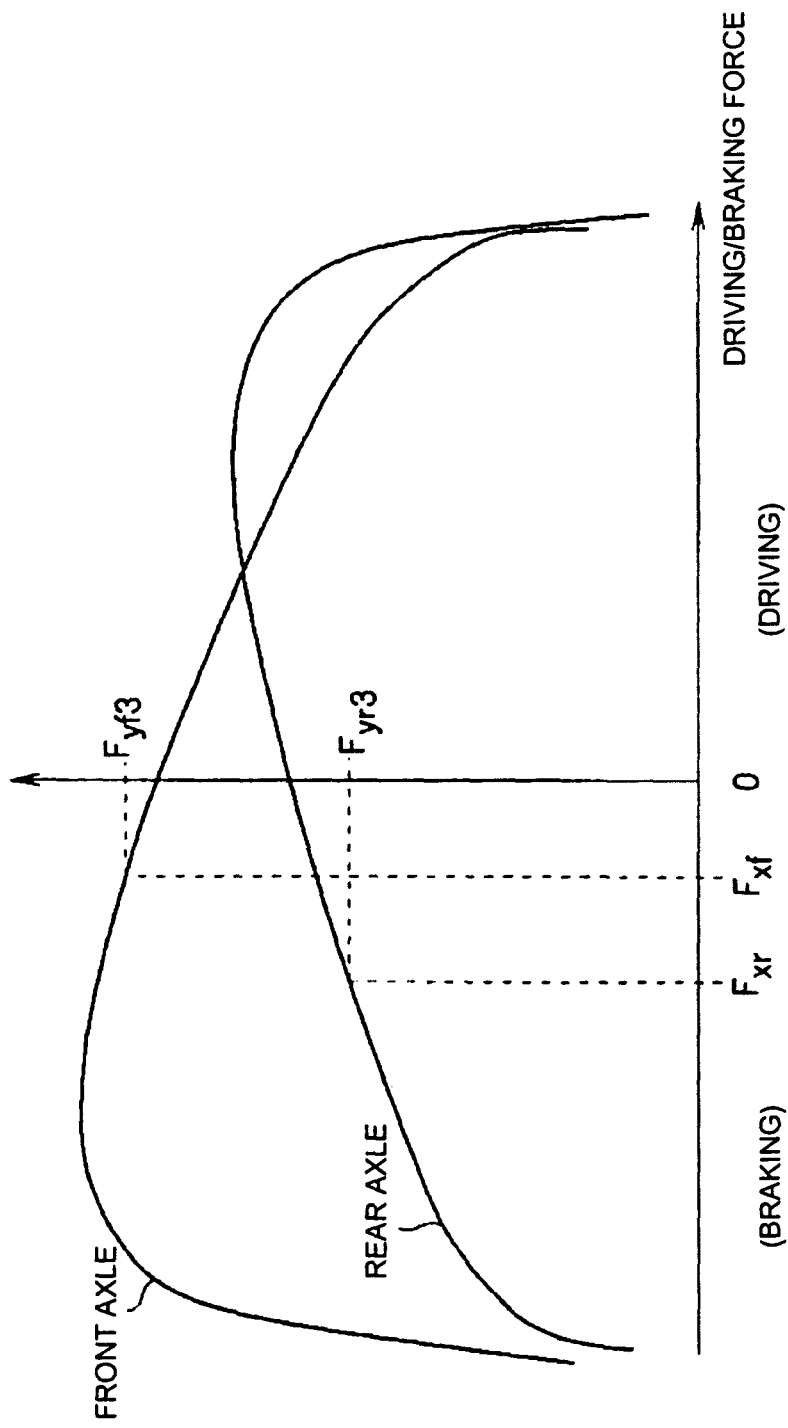
FIG. 10 is a diagram showing a characteristic of the maximum tire lateral force considering the nonlinearity with respect to the front-rear load shift and the influence of the friction circle.
Figure 11:
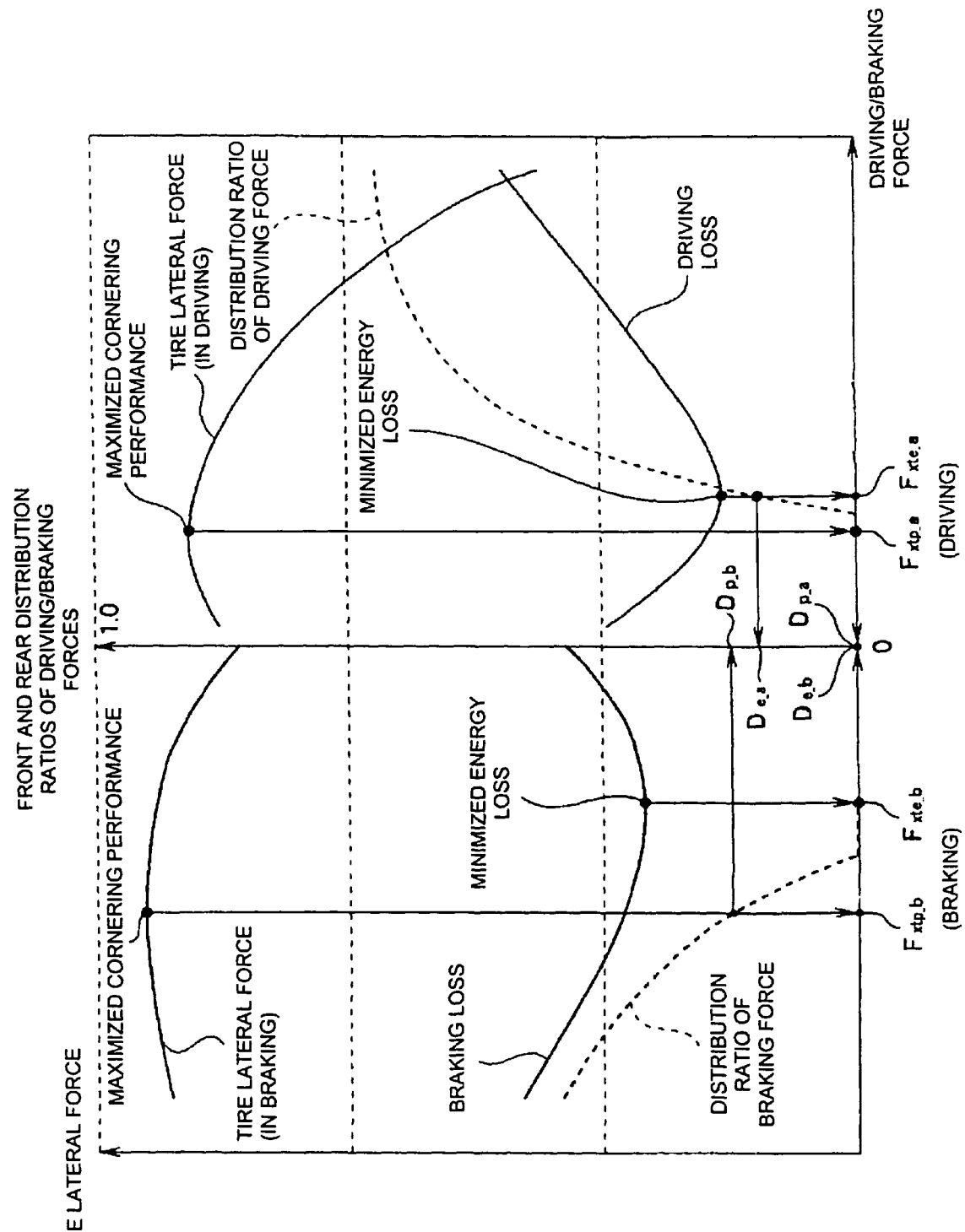
FIG. 11 is a specific explanatory diagram of driving/braking forces for minimizing an energy loss and maximizing a cornering performance in respective driving and braking ranges.
Figure 12:
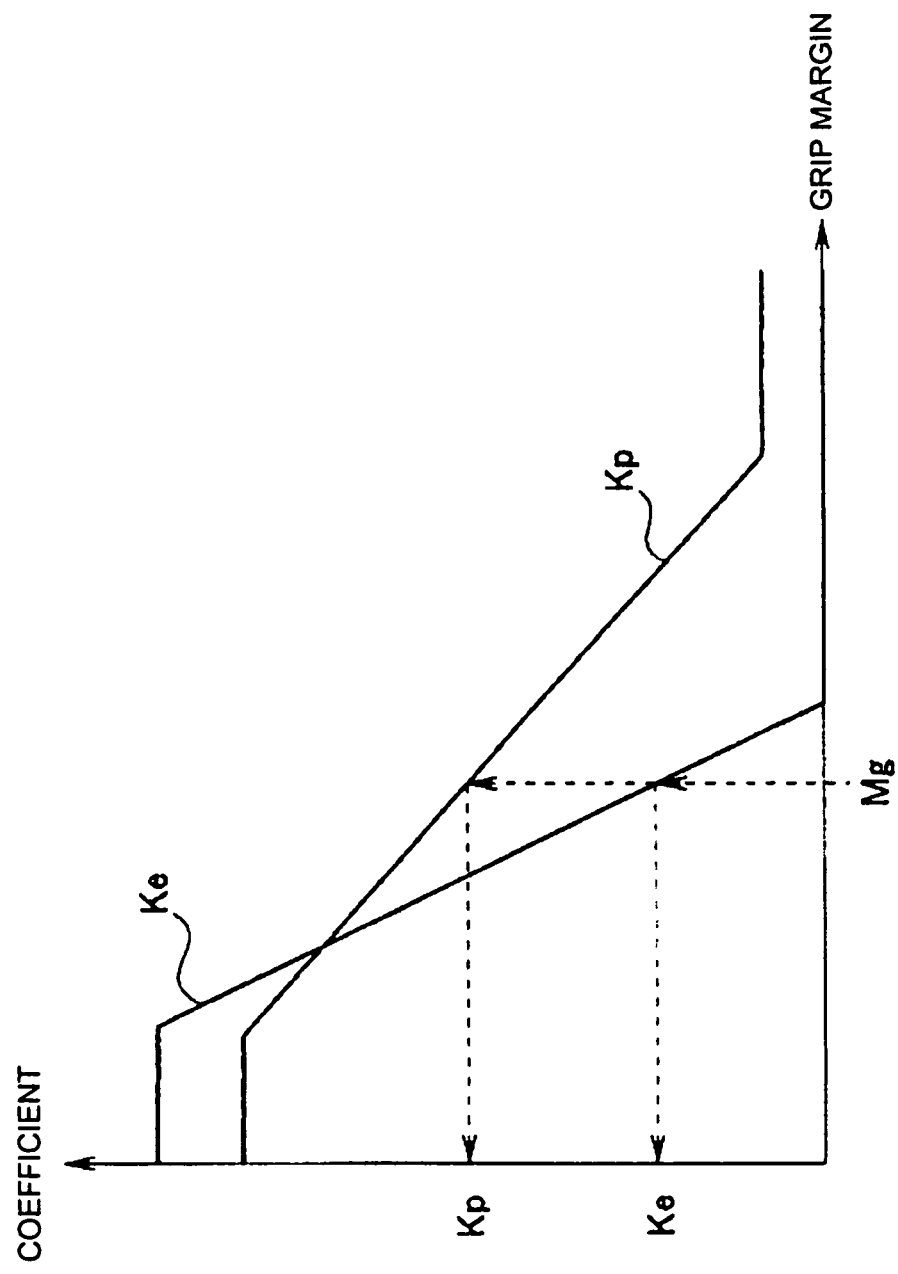
FIG. 12 is an explanatory diagram of a control strength coefficient Ke and a control ratio coefficient Kp which are set based on a grip margin.

FIGS. 1 to 11 show an embodiment of the present invention. FIG. 1 is an explanatory diagram showing an outline configuration of a vehicle having a vehicle motion control apparatus; FIG. 2 is a functional block diagram of a front/rear driving/braking force control unit; FIG. 3 is a flowchart of a front/rear driving/braking force control program; FIG. 4 is a flowchart of a routine for calculating first front/rear driving/braking forces Fxfte, Fxrte; FIG. 5 is a flowchart of a routine for calculating second front/rear driving/braking forces Fxftp, Fxrtp; FIG. 6 is a flowchart of a routine for calculating target driving/braking forces Fxft, Fxrt of the front and rear axles; FIG. 7 is a diagram showing a characteristic of a ground contact load and a maximum tire lateral force considering only a nonlinearity with respect to front-rear load shift; FIG. 8 is an explanatory diagram of the maximum tire lateral force of the front and rear axles considering only the influence of a friction circle; FIG. 9 is an explanatory diagram of a lateral force coefficient of the front and rear axles; FIG. 10 is a diagram showing a characteristic of the maximum tire lateral force considering the nonlinearity with respect to the front-rear load shift and the influence of the friction circle; FIG. 11 is a specific explanatory diagram of driving/braking forces for minimizing an energy loss and maximizing a cornering performance in respective driving and braking ranges; and FIG. 12 is an explanatory diagram of a control strength coefficient Ke and a control ratio coefficient Kp which are set based on a grip margin.

In FIG. 1, the reference numeral 1 represents a vehicle. Driving force of an engine 2 disposed in a front part of the vehicle is transferred from an automatic transmission (shown to include a torque converter and the like) 3 disposed in a rearward position of the engine 2 to a center differential device 4 via a transmission output shaft 3a. From the center differential device 4, the driving force is input to a rear-wheel final reduction gear 8 via a rear drive shaft 5, a propeller shaft 6 and a drive pinion 7, and also, input to a front-wheel final reduction gear 10 via a front drive shaft 9. Here, the automatic transmission 3, the center differential device 4, the front-wheel final reduction gear 10 or the like are provided in an unillustrated case together.

The driving force input to the rear-wheel final reduction gear 8 is transferred to a left rear wheel 12r1 via a rear-wheel left drive shaft 11r1 and to a right rear wheel 12rr via a rear-wheel right drive shaft 11rr. On the other hand, the driving force input to the front-wheel final reduction gear 10 is transferred to a left front wheel 12f1 via a front-wheel left drive shaft 11f1 and to a right front wheel 12fr via a front-wheel right drive shaft 11fr.

The reference numeral 13 represents a brake driver of the vehicle. To the brake driver 13, a master cylinder 15 having a connection to a brake pedal 14, which is operated by a driver, is connected. When the driver operates the brake pedal 14, the master cylinder 15 applies brake pressure to respective wheel cylinders (a left front wheel cylinder 16f1, a right front wheel cylinder 16fr, a left rear wheel cylinder 16r1 and a right rear wheel cylinder 16rr) of the four wheels 12f1, 12fr, 12r1 and 12rr via the brake driver 13. With this configuration, brake pressure is applied to the four wheels and the wheels are braked.

The brake driver 13 is a hydraulic unit having a pressure source, a pressure reducing valve, a pressure increasing valve or the like and is formed to be able to introduce brake pressure respectively and independently to the wheel cylinders 16f1, 16fr, 16r1, 16rr according to input signals.

The vehicle 1 has an engine control unit 21 for controlling the engine 2, a transmission control unit 22 for controlling the automatic transmission 3 and a brake control unit 23 for controlling the brake driver 13 and these control units 21, 22, 23 are connected to a driving/braking force control unit 20.

The driving/braking force control unit 20 is, for example, a control unit disclosed in JP-A No. 11-255004 and is configured to give a warning or decelerate according to need in order to control the vehicle to smoothly pass through a curved road in front of the vehicle.

More specifically, the driving/braking force control unit 20 calculates a reference deceleration based on a road surface friction coefficient and a road grade and calculates an allowable lateral acceleration based on a road shape and the road surface friction coefficient to calculate an allowable approach speed. Further, the driving/braking force control unit 20 calculates an equivalent linear distance which is obtained by converting a curved part of the road to the curve into a straight line. Then, the driving/braking force control unit 20 compares a necessary deceleration based on a vehicle speed, the allowable approach speed and the equivalent linear distance with a warning deceleration and an automatic deceleration which are calculated based on the reference deceleration. According to the compared result, warning is executed and signals are output to the engine control unit 21, transmission control unit 22 and brake control unit 23 so that a necessary automatic deceleration control is performed.

Further, to the driving/braking force control unit 20, target driving/braking forces Fxft, Fxrt of the front and rear axles are input from a later described front/rear driving/braking force control unit 30. The driving/braking force control unit 20 compares current driving/braking forces of the front and rear axles with the target driving/braking forces Fxft, Fxrt and accordingly a control is performed to make the driving/braking forces of the front and rear axles equal to the target driving/braking forces Fxft, Fxrt.

To the front/rear driving/braking force control unit 30, a road surface friction coefficient estimation unit 31 for estimating a road surface friction coefficient g and a lateral acceleration sensor 32 for detecting a lateral acceleration ($d^2y/dt^2$) are connected. Then, as shown in the flowchart of FIG. 3, in step (hereinafter, simply referred to as "S") S101, the front/rear driving/braking force control unit 30 reads required parameters, that is, the road surface friction coefficient g and the lateral acceleration ($d^2y/dt^2$). After that, in S102, the front/rear driving/braking force control unit 30 calculates driving/braking forces of the front and rear axles with the minimum energy loss that realizes a target steering characteristic as first front/rear driving/braking forces Fxfte, Fxrte. In S103, the front/rear driving/braking force control unit 30 calculates driving/braking forces of the front and rear axles that realize the target steering characteristic and maximize the sum of the maximum tire lateral forces of the front and rear axles as second front/rear driving/braking forces Fxftp, Fxrtp. Then, in S104, the front/rear driving/braking force control unit 30 sets a grip margin Mg based on tire lateral forces Fyf, Fyr of the front and rear axles, which are calculated based on the lateral acceleration ($d^2y/dt^2$), calculates the target driving/braking forces Fxft, Fxrt of the front and rear axles based on the first front/rear driving/braking forces Fxfte, Fxrte and the second front/rear driving/braking forces Fxftp, Fxrtp corresponding to the grip margin Mg, and outputs the target driving/braking forces Fxft, Fxrt to the driving/braking force control unit 20.

In other words, as shown in FIG. 2, the front/rear driving/braking force control unit 30 is mainly composed of a first front/rear driving/braking force calculation unit 30a, a second front/rear driving/braking force calculation unit 30b and a target front/rear axle driving/braking force calculation unit 30c.

To the first front/rear driving/braking force calculation unit 30a, the road surface friction coefficient μ is input from the road surface friction coefficient estimation unit 31. Then, as following the flowchart, shown in FIG. 4, of a routine for calculating the first front/rear driving/braking forces Fxfte, Fxrte, the first front/rear driving/braking force calculation unit 30a calculates the first front/rear driving/braking forces Fxfte, Fxrte, which are output to the front/rear axle target driving/braking force calculation unit 30c.

In other words, according to the flowchart of FIG. 4, firstly, in S201, previous first front/rear driving/braking forces Fxfte (k−1), Fxrte(k−1) are set as the front/rear driving/braking forces Fxf, Fxr (that is, Fxf=Fxfte (k−1), Fxr=Fxrte(k−1)).

In S202, using the equation (1), a load shift dFz between the front and rear axles caused by driving/braking is calculated.

$$dFz=(Fxf+Fxr)\sim(h/L) \tag{1}$$

Here, "h" represents the height of the center of gravity and "L" represents the wheelbase. Note that, regarding the sign (±) of the front/rear driving/braking forces, the plus sign (+) corresponds to the driving force.

Next, the process proceeds to S203, where a ground contact load Fzf of the front axle is calculated using the following equation (2) and a ground contact load Fzr of the rear axle is calculated using the following equation (3).

$$Fzf=Fzf0-dFz \tag{2}$$

$$Fzr=Fzr0+dFz \tag{3}$$

Here, "Fzf0" and "Fzr0" are ground contact loads of the front and rear axles when the driving/braking forces are zero (in a rest state).

Then, the process proceeds to S204, where referring to a previously set map (see FIG. 7) or the like and based on the ground contact loads Fzf, Fzr of the front and rear axles which are calculated in S203, maximum tire lateral forces Fyf1, Fyr1 of the front and rear axles considering only the nonlinearity with respect to the front-rear load shift are calculated.

Then, the process proceeds to S205, where based on the relationship of forces applied to the tires shown in FIG. 8, a maximum tire lateral force Fyf2 of the front wheel considering only the influence of a friction circle is calculated using the following equation (4) and a maximum tire lateral force Fyr2 of the rear wheel considering only the influence of the friction circle is calculated using the equation (5).

$$Fyf2=((Fzf\cdot\mu)^2-Fxf^2)^{1/2} \tag{4}$$

$$Fyr2=((Fzr\cdot\mu)^2-Fr2)^{1/2} \tag{5}$$

Then, the process proceeds to S206 where the maximum tire lateral forces Fyf2, Fyr2 of the front and rear axles considering only the influence of the friction circle are converted into lateral force coefficients Cyf2, Cyr2 of the front and rear shafts using the following equations (6) and (7).

$$Cyf2=Fyf2/(Fzf\cdot\mu) \tag{6}$$

$$Cyr2=Fyr2/(Fzr\cdot\mu) \tag{7}$$

Here, the relationship between absolute values of the front/rear driving/braking forces Fxf, Fxr and the lateral force coefficients Cyf2, Cyr2 of the front and rear axles is shown in FIG. 9.

Next, the process proceeds to S207 and, maximum tire lateral forces Fyf3, Fyr3 of the front and rear axles considering the nonlinearity with respect to the front-rear load shift and the influence of the friction circle are calculated using the following equations (8) and (9).

$$Fyf3=Fyf1\cdot Cyf2 \tag{8}$$

$$Fyr3=Fyr1\cdot Cyr2 \tag{9}$$

Here, the relationships between the front/rear driving/braking forces Fxf, Fxr and the maximum tire lateral forces Fyf3, Fyr3 of the front and rear axles considering the nonlinearity with respect to the front-rear load shift and the influence of the friction circle are shown in FIG. 10.

The process proceeds to S208 and it is determined whether the front/rear driving/braking forces Fxf, Fxr are the front and rear driving/braking forces that minimize the energy loss realizing the target steering characteristic. In other words, when the energy loss caused by driving or braking is considered as (|driving/braking force|· tire slip), since the tire slip (slip ratio) is proportional to the driving/braking forces, the energy loss is proportional to square values of the driving/braking forces.

Thus, it is determined whether the square sum (Fxf$^2$+Fxr$^2$) of the front and rear driving/braking forces is minimum and the ratio of maximum tire lateral forces Fyf3, Fyr3 (Fyf3: Fyr3) as the steering characteristic is a predetermined target value ((Cf:Cr), that is, a ratio in a neutral steering characteristic, for example).

More specifically, when the steering characteristic is in a relationship of Fyr3·(Cf−ϵ)≦Fyf3·Cr≦Fyr3−(Cf+ϵ) ("ϵ" is a constant) and is substantially a target steering characteristic, there is a relation of (Fxf$^2$+Fxr$^2$) (Fxfte (k−1)$^2$+Fxrte (k−1)$^2$), and the energy loss is maintained in the same level of or getting larger than a previous calculated value, it is determined that the front/rear driving/braking forces Fxf, Fxr are the front and rear driving/braking forces that minimize the energy loss realizing the target steering characteristic. Then, the process proceeds to S209 and sets Fxfte=Fxf, Fxrte=Fxr. Then, the process proceeds to S210 and outputs the first front/rear driving/braking forces Fxfte, Fxrte to the target front/rear axle driving/braking force calculation unit 30c. After that, the process ends the routine.

On the other hand, when it is determined that it is not the front and rear driving/braking forces that minimize the energy loss realizing the target steering characteristic in S208, the process proceeds to S211 to correct the front/rear driving/braking forces Fxf, Fxr and repeat the processes starting from S202 as described below.

In other words, when there is a relationship of Fyr3∼(Cf−ϵ)≧Fyf3·Cr, the front wheel maximum tire lateral force is small and it tends to be in an understeer condition compared to a target steering characteristic, the relationship can be described as:

$$Fxf=Fxf-\text{sign}(Fxf)\cdot\Delta 1 \tag{10}$$

$$Fxr=Fxr+\text{sign}(Fxr)\cdot\Delta 1 \tag{11}$$

Here, "sign(Fxf)" is a sign (±) of Fxf, "sign(Fxr)" is a sign (±) of Fxr and "Δ1" represents a previously set small amount.

Further, when there is a relationship of Fyf3·Cr≧Fyr3·(Cf+ϵ), the front wheel maximum tire lateral force becomes large and it tends to be in an oversteer condition compared to the target steering characteristic, the relationship can be described as:

$$Fxf=Fxf+\text{sign}(Fxf)\cdot\Delta 1 \tag{12}$$

$$Fxr=Fxr-\text{sign}(Fxr)\cdot\Delta 1 \tag{13}$$

Further, when there is a relationship of Fyr3·(Cf−ϵ)≦Fyf3−Cr≦Fyr3−(Cf+ϵ), it is a substantially target steering characteristic, and there is a relationship of (Fxf$^2$+Fxr$^2$)< (Fxfte(k−1)$^2$+Fxrte(k−1)$^2$), the energy loss tends to be reduced with respect to the previous calculation value and the energy loss can be further reduced, the relationship can be described as:

$$Fxf = Fxf - Cf \cdot \Delta 2 \quad (14)$$

$$Fxr = Fxr - Cr \cdot \Delta 2 \quad (15)$$

Here, "Δ2" represents a previously set small amount.

By repeating the processes from S202 to S211 as described above, the driving/braking forces of the front and rear axles that minimize the energy loss realizing the target steering characteristic are calculated as the first front/rear driving/braking forces Fxfte, Fxrte.

More specifically, regarding the first front/rear driving/braking forces Fxfte, Fxrte, when it is assumed that FIG. 11 shows target total driving/braking forces Fxte_b, Fxte_a at the minimum energy loss and front/rear driving/braking force distribution ratios De_b, De_a at the minimum energy loss, front/rear braking forces Fxfte_b, Fxrte_b at the minimum energy loss in braking and front/rear driving forces Fxfte_a, Fxrte_a at the minimum energy loss in driving are expressed as the following equations (16) to (19).

$$Fxfte\_b = Fxte\_b \cdot De\_b \quad (16)$$

$$Fxrte\_b = Fxte\_b \cdot (1 - De\_b) \quad (17)$$

$$Fxfte\_a = Fxte\_a \cdot De\_a \quad (18)$$

$$Fxrte\_a = Fxte\_a \cdot (1 - De\_a) \quad (19)$$

As described above, the first front/rear driving/braking force calculation unit 30a serves as a maximum tire lateral force calculator and a first front/rear driving/braking force calculator.

To the second front/rear driving/braking force calculation unit 30b, the road surface friction coefficient μ is input from the road surface friction coefficient estimation unit 31. Then, as following the flowchart, shown in FIG. 5, of the routine for calculating the second front/rear driving/braking forces Fxftp, Fxrtp, the second front/rear driving/braking forces Fxftp, Fxrtp are calculated and output to the target front/rear axle driving/braking force calculation unit 30c.

In other words, in the flowchart shown in FIG. 5, firstly, in S301, the previous second front/rear driving/braking forces Fxftp(k−1), Fxrtp(k−1) are set as front/rear driving/braking forces Fxf, Fxr (that is, Fxf=Fxftp(k−1), Fxr=Fxrtp(k−1)).

The processes from S302 to S307 are the same as the processes from S202 to S207 in the above first front/rear driving/braking force calculation unit 30a and, in S302, a load shift dFz between the front and rear axles caused by braking and driving forces is calculated using the above equation (1).

Next, in S303, ground contact loads Fzf, Fzr of the front and rear axles are calculated using the above equations (2) and (3).

Next, the process proceeds to S304, and, with reference to a previously set map (see FIG. 7) or the like, maximum tire lateral forces Fyf1, Fyr1 of the front and rear axles considering only the nonlinearity with respect to the front-rear load shift are calculated based on the ground contact loads Fzf, Fzr of the front and rear axles which are calculated in S303.

Next, the process proceeds to S305 and, based on the relationship of forces applied to the tires shown in FIG. 8, the maximum tire lateral forces Fyf2, Fyr2 of the front and rear axles considering only the influence of the friction circle are calculated using the equations (4) and (5).

Next, the process proceeds to S306 and, using the above equations (6) and (7), the maximum tire lateral forces Fyf2, Fyr2 of the front and rear axles considering only the influence of the friction circle are converted into lateral force coefficients Cyf2, Cyr2 of the front and rear axles.

Next, the process proceeds to S307 and, using the above equations (8) and (9), maximum tire lateral forces Fyf3, Fyr3 of the front and rear axles considering the nonlinearity with respect to the front-rear load shift and the influence of the friction circle are calculated.

Then, the process proceeds to S308, where it is determined whether the front/rear driving/braking forces Fxf, Fxr are the front and rear driving/braking forces that realize the target steering characteristic and maximize the sum of the maximum tire lateral forces of the front and rear axles. In other words, it is determined whether the sum of the maximum tire lateral forces Fyf3, Fyr3 of the front and rear axles considering the nonlinearity with respect to the front-rear load shift and the influence of the friction circle (Fyf3+Fyr3) is maximum and the ratio of the maximum tire lateral forces Fyf3, Fyr3 (Fyf3:Fyr3) as the steering characteristic is the predetermined target value ((Cf:Cr); that is, a ratio in neutral steering, for example).

More specifically, when the steering characteristic has a relationship of Fyr3·(Cf−ε)≦Fyf3·Cr≦Fyr3·(Cf+ε) (the "ε" is a constant) and is substantially a target steering characteristic, there is a relationship of (Fyf3+Fyr3)≦(Fyf3 (k−1)+Fyr3 (k−1)), and the sum of the maximum tire lateral forces of the front and rear axles is maintained in a same level of or tends to be reduced from the previous calculation value, it is determined that the front/rear driving/braking forces Fxf, Fxr are the front and rear driving/braking forces that realize the target steering characteristic and maximize the sum of the maximum tire lateral forces of the front and rear axles. Then, the process proceeds to S309 and sets as Fxftp=Fxf and Fxrtp=Fxr. Then, the process proceeds to S310 to output the second front/rear driving/braking forces Fxftp, Fxrtp to the target front/rear axle driving/braking force calculation unit 30c, and ends the routine.

On the other hand, in S308, when it is determined that the front/rear driving/braking forces Fxf, Fxr are not the front and rear driving/braking forces that realize the target steering characteristic and maximize the sum of the maximum tire lateral force of the front and rear axles, the process proceeds to S311 to correct the front/rear driving/braking forces Fxf, Fxr and repeat the processes starting from S302 as described below.

In other words, when there is a relationship of Fyr3·(Cf−ε)≧Fyf3·Cr, the front wheel maximum tire lateral force is small and it tends to be in an understeer condition compared to a target steering characteristic, the relationship can be described as:

$$Fxf = Fxf - \text{sign}(Fxf) \cdot \Delta 1 \quad (20)$$

$$Fxr = Fxr + \text{sign}(Fxr) \cdot \Delta 1 \quad (21)$$

Here, "sign(Fxf)" is a sign (±) of Fxf, "sign(Fxr)" is a sign (±) of Fxr and "Δ1" represents a previously set small amount.

Further, when there is a relationship of Fyf3·Cr≧Fyr3·(Cf+ε), the front wheel maximum tire lateral force is large and it tends to be in an oversteer condition compared to the target steering characteristic, the relationship can be described as:

$$Fxf = Fxf + \text{sign}(Fxf) \cdot \Delta 1 \quad (22)$$

$$Fxr = Fxr - \text{sign}(Fxr) \cdot \Delta 1 \quad (23)$$

Further, when there is a relationship of Fyr3·(Cf−ε)≦Fyf3·Cr≦Fyr3·(Cf+ε), it is substantially a target steering characteristic, there is a relationship of (Fyf3+Fyr3)>(Fyf3 (k−1)+Fyr3(k−1)), and the sum of the maximum tire lateral forces of the front and rear axles tends to be increased with respect to previous calculation values, the relationship can be described as:

$$Fxf=Fxf-Cf\cdot\Delta2 \quad (24)$$

$$Fxr=Fxr-Cr\cdot\Delta2 \quad (25)$$

Here, "Δ2" represents a previously set small amount.

By repeating the steps from S302 to S311 in this manner, driving/braking forces of the front and rear axles that realize the target steering characteristic and maximize the sum of the maximum tire lateral forces of the front and rear axles are calculated as second front/rear driving/braking forces Fxftp, Fxrtp. In other words, the second front/rear driving/braking forces Fxftp, Fxrtp are to be the front/rear driving/braking forces Fxftp, Fxrtp that maximize the cornering performance.

More specifically, regarding the second front/rear driving/braking forces Fxftp, Fxrtp, when it is assumed that FIG. 11 shows target total driving/braking forces Fxtp_b, Fxtp_a at the maximum cornering performance and front/rear driving/braking force distribution ratios Dp_b, Dp_a at the maximum cornering performance, front/rear braking forces Fxftp_b, Fxrtp_b at the maximum cornering performance in braking and front/rear driving forces Fxftp_a, Fxrtp_a at the maximum cornering performance in driving are expressed as the following equations (26) to (29).

$$Fxftp\_b=Fxtp\_b\cdot Dp\_b \quad (26)$$

$$Fxrtp\_b=Fxtp\_b\cdot(1-Dp\_b) \quad (27)$$

$$Fxftp\_a=Fxtp\_a\cdot Dp\_a \quad (28)$$

$$Fxrtp\_a=Fxtp\_a\cdot(1-Dp\_a) \quad (29)$$

As described above, the second front/rear driving/braking force calculation unit 30b serves as a maximum tire lateral force calculator and a second front/rear driving/braking force calculator.

To the target front/rear axle driving/braking force calculation unit 30c, the lateral acceleration $(d^2y/dt^2)$ is input from the lateral acceleration sensor 32, the first front/rear driving/braking forces Fxfte, Fxrte are input from the first front/rear driving/braking force calculation unit 30a, and the second front/rear driving/braking forces Fxftp, Fxrtp are input from the second front/rear driving/braking force calculation unit 30b. Then, as following the flowchart, shown in FIG. 6, of the routine for calculating the target driving/braking forces Fxft, Fxrt of the front and rear axles, the target driving/braking forces Fxft, Fxrt of the front and rear axles are calculated and output to the driving/braking force control unit 20.

In other words, in the flowchart shown in FIG. 6, firstly, in S401, tire lateral forces Fyf, Fyr of the front and rear axles are calculated using the following equations (30) and (31).

$$Fyf=m\cdot(d^2y/dt^2)\cdot(Lr/L) \quad (30)$$

$$Fyr=m\cdot(d^2y/dt^2)\cdot(Lf/L) \quad (31)$$

Here, "m" represents a vehicle mass, "Lf" represents a distance between the front shaft and the gravity center, and "Lr" represents a distance between the rear axle and the gravity center of the vehicle.

Next, the process proceeds to S402, where a grip margin Mg is set using the following equation (32).

$$Mg=1-\max(Fyf/(Fzf0\cdot\mu), Fyr/(Fzr0\cdot\mu)) \quad (32)$$

In other words, as it is clear with the above equation (32), the grip margin Mg is a value that indicates a grip margin of the front and rear wheels and a larger value of the grip margin Mg indicates a larger margin (a smaller value of the margin Mg indicates a smaller margin).

Next, the process proceeds to S403 and, with reference to a previously set map (FIG. 12, for example) or the like, a control strength coefficient Ke and a control ratio coefficient Kp are set based on the grip margin Mg. As expressed in the following equations (33) and (34), the control strength coefficient Ke is a coefficient which sets an entire control strength and is set to be a smaller value as the grip margin Mg becomes larger, as shown in FIG. 12. Further, as expressed in the following equations (33) and (34), the control ratio coefficient Kp is a coefficient which sets the ratio of the first front/rear driving/braking forces Fxfte, Fxrte and the second front/rear driving/braking forces Fxftp, Fxrtp and is set to be a smaller value as the grip margin Mg becomes larger, as shown in FIG. 12.

Next, the process proceeds to S404, where based on the following equations (33) and (34), for example, the target driving/braking forces Fxft, Fxrt of the front and rear axles are calculated and output to the driving/braking force control unit 20. Then, the routine is ended.

$$Fxft=Ke\cdot((1-Kp)\cdot Fxfte+Kp\cdot Fxftp) \quad (33)$$

$$Fxrt=Ke\cdot((1-Kp)\cdot Fxrte+Kp\cdot Fxrtp) \quad (34)$$

In other words, using the above equations (33) and (34), as the grip margin Mg becomes larger, the control ratio coefficient Kp is set to be smaller so that the ratio of the first front/rear driving/braking forces Fxfte, Fxrte becomes larger and the ratio of the second front/rear driving/braking forces Fxftp, Fxrtp becomes smaller. Further, as the grip margin Mg becomes larger, the control strength coefficient Ke is set to be a smaller value and the entire target driving/braking forces Fxft, Fxrt of the front and rear axles are set to be smaller.

On the other hand, as the grip margin Mg becomes smaller, the control ratio coefficient Kp is set to be a larger value so that the ratio of the first front/rear driving/braking forces Fxfte, Fxrte becomes smaller and the ratio of the second front/rear driving/braking forces Fxftp, Fxrtp becomes larger. Further, as the grip margin Mg becomes smaller, the control strength coefficient Ke is set to be a larger value and the entire target driving/braking forces Fxft, Fxrt of the front and rear axles are set to be larger.

As described above, the target front/rear shaft driving/braking force calculation unit 30c serves as a grip margin calculator and a target driving/braking force calculator.

Then, when the target driving/braking forces Fxft, Fxrt of the front and rear shafts axles input from the target front/rear axle driving/braking force calculation unit 30c of the front/rear driving/braking force control unit 30, the driving/braking force control unit 20 compares the current driving/braking forces of the front and rear axles with the target driving/braking forces Fxft, Fxrt and a control is executed to make the driving/braking forces of the front and rear axles equal to the target driving/braking forces Fxft, Fxrt.

As described above, according to the embodiment of the present invention, as the tire grip margin Mg becomes larger, a control is executed to increase a ratio of the driving/braking forces (first front/rear driving/braking forces Fxfte, Fxrte) of the front and rear axles that realizes the target steering characteristic with the minimum energy loss. On the other hand, in a range where the tire grip margin Mg is small, a control is executed based on the maximum tire lateral forces of the front and rear axles to increase the ratio of the driving/braking forces (second front/rear driving/braking forces Fxftp, Fxrtp) of the front and rear axles that realizes the target steering characteristic and maximizes the sum of the maximum tire lateral forces of the front and rear axles. Further, as the tire grip margin Mg becomes larger, a control is executed to reduce the target driving/braking forces Fxft, Fxrt of the front and rear axles. With this configuration, in an range where the tire grip margin is large, it is possible to realize a smooth and highly fuel-efficient traveling with a low travel energy loss by controlling driving/braking force control amount and setting the driving/braking forces that minimize the energy loss to suppress the increase of the traveling resistance while maintaining the target steering characteristic. Further, in a limit range of a hazard avoidance or the like in which the tire grip margin is small, the driving/braking forces are controlled to maximize the vehicle response (lateral acceleration in turn) to a steering operation so that the effect of a deceleration control can also be obtained as a result.

Note that the driving/braking force control unit 20 is not limited to what is described in the above embodiment and other brake control units, driving force control devices or the like can be used.

What is claimed is:

1. A vehicle motion control apparatus, comprising:
    a lateral acceleration sensor configured to measure lateral acceleration;
    a maximum tire lateral force calculator configured to calculate maximum tire lateral forces of front and rear axles considering a nonlinearity with respect to a front-rear load shift and an influence of a friction circle according to driving/braking forces of the front and rear axles and road surface information;
    a first front/rear driving/braking force calculator configured to calculate the driving/braking forces of the front and rear axles that minimize an energy loss realizing a target steering characteristic as first front/rear driving/braking forces based on the driving/braking forces of the front and rear axles and the maximum tire lateral forces of the front and rear axles;
    a second front/rear driving/braking force calculator configured to calculate driving/braking forces of the front and rear axles that realize the target steering characteristic and maximize a sum of the maximum tire lateral forces of the front and rear axles as second front/rear driving/braking forces based on the driving/braking forces of the front and rear axles and the maximum tire lateral forces of the front and rear axles;
    a grip margin calculator configured to calculate a margin of a grip of the front and rear wheels as a grip margin based on a lateral acceleration evaluated based on a travel condition of the vehicle;
    a target driving/braking force calculator configured to calculate target driving/braking forces of the front and rear axles based on the first front/rear driving/braking forces and the second front/rear driving/braking forces, according to the grip margin; and
    a driving/braking force control unit that controls the driving/braking forces of the front and rear axles.

2. The vehicle motion control apparatus according to claim 1, wherein the first front/rear driving/braking force calculator is configured to calculate a square sum of the driving/braking forces of the front and rear axles and a steering characteristic with respect to the maximum tire lateral forces of the front and rear axles and to calculate the first front/rear driving/braking forces such that the driving/braking force control unit corrects the driving/braking forces of the front and rear axles based on a calculation result.

3. The vehicle motion control apparatus according to claim 1, wherein the second front/rear driving/braking force calculator is configured to calculate a sum of the maximum tire lateral forces of the front and rear axles and a steering characteristic with respect to the maximum tire lateral forces of the front and rear axles and calculate the second front/rear driving/braking forces such that the driving/braking force control unit corrects the driving/braking forces of the front and rear axles based on the calculation result.

4. The vehicle motion control apparatus according to claim 1, wherein the grip margin calculator is configured to set the grip margin based on the tire lateral forces of the front and rear axles that are calculated based on the road surface information and the lateral acceleration.

5. The vehicle motion control apparatus according to claim 1, wherein the target driving/braking force calculator is configured to increase a ratio of the second front/rear driving/braking forces as the margin of grip of front and rear wheels reduces.

6. The vehicle motion control apparatus according to claim 1, wherein the target driving/braking force calculator is configured to increase a ratio of the first front/rear driving/braking forces as the margin of grip of front and rear wheels increases.

7. The vehicle motion control apparatus according to claim 1, wherein the target driving/braking force calculator is configured to set the target driving/braking forces of the front and rear axles smaller as the margin of grip of front and rear wheels increases.

8. The vehicle motion control apparatus according to claim 1, wherein the target driving/braking force calculator receives the lateral acceleration independent of the first front/rear driving/braking force calculator and the second front/rear driving/braking force calculator.

9. The vehicle motion control apparatus according to claim 1, wherein the grip margin calculator evaluates the grip margin independent of the first front/rear driving/braking forces and the second front/rear driving/braking forces.

10. The vehicle motion control apparatus according to claim 1, wherein the grip margin calculator evaluates the grip margin independent of the first front/rear driving/braking force calculator and the second front/rear driving/braking force calculator.

11. The vehicle motion control apparatus according to claim 1, further comprising:
    a road surface friction coefficient estimation unit for estimating a road surface friction coefficient,
    wherein the first front/rear driving/braking force calculator calculates the first front/rear driving/braking forces based on the road surface friction coefficient.

12. The vehicle motion control apparatus according to claim 11, wherein the second front/rear driving/braking force calculator calculates the second front/rear driving/braking forces based on the road surface friction coefficient.

13. The vehicle motion control apparatus according to claim 11, wherein the second front/rear driving/braking force calculator calculates the second front/rear driving/braking forces based on the road surface friction coefficient independent of the first front/rear driving/braking force calculator.

14. The vehicle motion control apparatus according to claim 13, wherein the
    lateral acceleration sensor for detecting the lateral acceleration independent of the road surface friction coefficient estimation unit.

15. The vehicle motion control apparatus according to claim 14, wherein the first front/rear driving/braking force calculator and the second front/rear driving/braking force calculator calculate the first front/rear driving/braking forces and the second front/rear driving/braking forces, respectively, independent of the lateral acceleration detected by the lateral acceleration sensor.

16. The vehicle motion control apparatus according to claim 1, wherein the driving/braking force control unit compares a current driving/braking forces of the front and rear axles with the target driving/braking forces for controlling the driving/braking forces of the front and rear axles to be equal to the target driving/braking forces.

* * * * *